United States Patent
Okano et al.

(10) Patent No.: US 10,128,029 B2
(45) Date of Patent: Nov. 13, 2018

(54) FERRITE CERAMICS, FERRITE SINTERED PLATE AND FERRITE SINTERED SHEET

(71) Applicant: TODA KOGYO CORP., Hiroshima-shi, Hiroshima-ken (JP)

(72) Inventors: Yoji Okano, Otake (JP); Tomohiro Dote, Otake (JP); Makoto Sadai, Otake (JP); Shingo Honda, Otake (JP); Katsumi Nakai, Otake (JP); Yasuhiko Fujii, Otake (JP)

(73) Assignee: TODA KOGYO CORP., Hiroshima (JP)

( * ) Notice: Subject to any disclaimer, the term of this patent is extended or adjusted under 35 U.S.C. 154(b) by 0 days.

(21) Appl. No.: 15/032,711

(22) PCT Filed: Oct. 30, 2014

(86) PCT No.: PCT/JP2014/078904
§ 371 (c)(1),
(2) Date: Apr. 28, 2016

(87) PCT Pub. No.: WO2015/064693
PCT Pub. Date: May 7, 2015

(65) Prior Publication Data
US 2016/0284453 A1    Sep. 29, 2016

(30) Foreign Application Priority Data
Oct. 31, 2013  (JP) .................. 2013-227639

(51) Int. Cl.
*H01F 1/10*  (2006.01)
*H01F 1/34*  (2006.01)
(Continued)

(52) U.S. Cl.
CPC ............... *H01F 1/10* (2013.01); *C04B 35/26* (2013.01); *C04B 35/62625* (2013.01);
(Continued)

(58) Field of Classification Search
CPC ........... H01F 1/10; H01F 1/344; H01Q 1/243; H01Q 1/38; B32B 3/30; B32B 18/00;
(Continued)

(56) References Cited

U.S. PATENT DOCUMENTS 6,489,877 B1    12/2002  Yamamoto et al.
2002/0114962 A1  8/2002  Kawasaki et al.
(Continued)

FOREIGN PATENT DOCUMENTS

CN    1296271    5/2001
CN    101262085    9/2008
(Continued)

OTHER PUBLICATIONS

International Search Report for PCT/JP2014/078904, dated Feb. 3, 2015, 4 pages.
(Continued)

*Primary Examiner* — Joanna Pleszczynska
(74) *Attorney, Agent, or Firm* — Nixon Vanderhye P.C.

(57) ABSTRACT

An object or technical task of the present invention is to provide a ferrite sintered sheet having a dense ferrite microfine structure which has a large $\mu'$ value, a small $\mu''$ value, and a small temperature-dependent change of the $\mu'$ value thereof. The present invention relates to a ferrite ceramics having a composition comprising 47.5 to 49.8 mol % of $Fe_2O_3$, 13.5 to 19.5 mol % of NiO, 21 to 27 mol % of ZnO, 7.5 to 12.5 mol % of CuO and 0.2 to 0.8 mol % of CoO, all of the molar amounts being calculated in terms of the respective oxides, the ferrite ceramics further comprising 0.2 to 1.4% by weight of $SnO_2$ and 0.005 to 0.03% by weight of S and having a density of 5.05 to 5.30 g/cm³; and a ferrite sintered sheet comprising the ferrite sintered plate on a
(Continued)

surface of which a groove or grooves are formed, and an adhesive layer and/or a protective layer formed on the ferrite sintered plate.

6 Claims, 1 Drawing Sheet

(51) Int. Cl.
    *C04B 35/26*     (2006.01)
    *B32B 3/30*     (2006.01)
    *B32B 18/00*     (2006.01)
    *C04B 35/626*     (2006.01)
    *C04B 35/638*     (2006.01)
    *H01Q 1/24*     (2006.01)
    *H01Q 1/38*     (2006.01)

(52) U.S. Cl.
    CPC ...... *C04B 35/62675* (2013.01); *C04B 35/638* (2013.01); *H01F 1/344* (2013.01); *H01Q 1/243* (2013.01); *H01Q 1/38* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/6025* (2013.01); *C04B 2235/72* (2013.01); *C04B 2235/726* (2013.01); *C04B 2235/77* (2013.01)

(58) Field of Classification Search
    CPC .............. C04B 35/265; C04B 35/2608; C04B 2235/3275; C04B 2235/3274; C04B 2235/3279; C04B 2235/3281; C04B 2235/3284; Y10T 428/24479; Y10T 428/2457; Y10T 428/24612
    USPC .................................................. 428/156, 702
See application file for complete search history.

(56) References Cited

U.S. PATENT DOCUMENTS

| | | | |
|---|---|---|---|
| 2008/0224937 A1 | 9/2008 | Kimura et al. | |
| 2010/0085140 A1 | 4/2010 | Tanaka et al. | |
| 2011/0129641 A1 | 6/2011 | Kimura et al. | |
| 2012/0062435 A1* | 3/2012 | Kato | ........................ H01Q 7/06 343/787 |
| 2012/0229354 A1* | 9/2012 | Ishikura | .............. C04B 35/2633 343/787 |
| 2012/0237728 A1 | 9/2012 | Kimura et al. | |

FOREIGN PATENT DOCUMENTS

| | | |
|---|---|---|
| CN | 101652336 | 2/2010 |
| EP | 1 219 577 | 7/2002 |
| EP | 2 141 137 | 1/2010 |
| JP | 5-258937 | 10/1993 |
| JP | 2002-124408 | 4/2002 |
| JP | 2002-255637 | 9/2002 |
| JP | 2005-340759 | 12/2005 |
| JP | 2008-252089 | 10/2008 |
| JP | 2013-133263 | 7/2013 |
| WO | WO 2008/133152 | 11/2008 |
| WO | WO 2014/069440 | 5/2014 |

OTHER PUBLICATIONS

International Preliminary Report on Patentability issued in PCT/JP2014/078904 dated May 3, 2016.
Extended European Search Resort issued in Appln. No. 14858963.3 dated Jun. 6, 2017.

* cited by examiner

FERRITE CERAMICS, FERRITE SINTERED PLATE AND FERRITE SINTERED SHEET

This application is the U.S. national phase of International Application No. PCT/JP2014/078904 filed 30 Oct. 2014, which designated the U.S. and claims priority to JP Patent Application No. 2013-227639 filed 31 Oct. 2013, the entire contents of each of which are hereby incorporated by reference.

TECHNICAL FIELD

The present invention relates to a ferrite ceramics, a ferrite sintered plate, and a ferrite sintered sheet comprising the ferrite sintered plate and an adhesive layer and/or a protective layer formed on a surface of the ferrite sintered plate.

BACKGROUND ART

Communication equipments such as cellular phones and smart phones are mounted with a system capable of communicating information using a flat coil antenna, such as NFC (near field (radio) communication) and payment system. In these communication equipments, the antenna is arranged close to a member including a metal, such as a circuit board and a battery, so that there tends to occur such a fear that the communication equipments are considerably deteriorated in communication sensitivity. For this reason, in order to increase the communication sensitivity, there has been proposed such an arrangement that a ferrite sintered sheet is disposed between the antenna and the member including a metal.

In these systems, in order to enhance the communication sensitivity, there has been proposed such a technology that a magnetic permeability of the ferrite sintered sheet is controlled by adding CoO to Ni—Zn—Cu ferrite (Patent Literatures 1 and 2).

On the other hand, in the application field of inductor, there has been proposed a method of obtaining a high-density inductor that is excellent in temperature characteristics of magnetic permeability by adding $SnO_2$, Co oxide and Bi oxide thereto (Patent Literature 3). In addition, there has been proposed a method of controlling diffusion of Ag into ferrite by adjusting contents of S and Cl in the ferrite in respective predetermined ranges (Patent Literature 4). Furthermore, it is known that ferrite comprising $SnO_2$ is used in an inductor (Patent Literature 5).

CITATION LIST

Patent Literatures

Patent Literature 1: Japanese Patent Application Laid-Open (KOKAI) No. 2005-340759
Patent Literature 2: Japanese Patent Application Laid-Open (KOKAI) No. 2013-133263
Patent Literature 3: Japanese Patent Application Laid-Open (KOKAI) No. 2002-255637
Patent Literature 4: Japanese Patent Application Laid-Open (KOKAI) No. 5-258937
Patent Literature 5: Japanese Patent Application Laid-Open (KOKAI) No. 2002-124408

SUMMARY OF INVENTION

Technical Problem

In order to reduce a size of communication equipments and enhance a function thereof, it has been demanded to further improve a communication sensitivity of a flat coil antenna mounted therein. To this end, it is necessary to increase an inductance of the antenna by increasing a real part ($\mu'$) of a magnetic permeability of a ferrite sintered sheet. On the other hand, the ferrite sintered sheet has such a characteristic that at a frequency of 13.56 MHz that is a communication frequency of the ferrite sintered sheet, as the $\mu'$ of the magnetic permeability of the ferrite sintered sheet increases, a loss represented by an imaginary part ($\mu''$) of the magnetic permeability of the ferrite sintered sheet becomes larger. The loss tends to cause deterioration in communication sensitivity of the antenna. Therefore, there is an increasing demand for a ferrite sintered sheet having $\mu''$ as small as possible and $\mu'$ as large as possible.

Although in Patent Literature 1, the technology of adding CoO to the ferrite is described, the resulting ferrite sintered sheet tends to have a small $\mu'$ value, so that the antenna tends to be hardly improved in communication sensitivity to a sufficient extent.

In Patent Literature 2, there has been proposed the ferrite sintered sheet having a microfine structure constituted of crystal grains and voids which is in the course of grain growth. However, since the voids are present in the microfine structure of the ferrite sintered sheet, there tends to occur such a drawback that the ferrite sintered sheet readily suffers from breakage upon handling during the production process. Therefore, in order to obtain a hardly breakable ferrite sintered sheet, it is necessary to increase a sintered density of the ferrite sintered sheet and remove voids from the microfine structure.

Patent Literature 3 fails to take the inclusion of S in ferrite into consideration. Although in Patent Literature 4, the contents of S and Cl components in the ferrite are adjusted in order to control diffusion of Ag in an internal conductor, the ferrite has no Sn content, and therefore the temperature-dependent change of $\mu'$ of the ferrite sheet becomes large. The ferrite described in Patent Literature 5 has no Co content, so that the $\mu''$ value of the sheet is large.

Further, the ferrite sintered sheet has been frequently incorporated in portable equipments and used outdoors. Therefore, in order to stabilize characteristics of the antenna against the change in outside air temperature, it is necessary to reduce the change of its magnetic permeability relative to temperature.

Accordingly, an object or technical task of the present invention is to provide a ferrite sintered sheet having a high sintered density, a large $\mu'$ value, a small $\mu''$ value, and a small temperature-dependent change of the $\mu'$ value thereof.

Solution to Problem

The above object or technical task can be achieved by the following aspects of the present invention.

That is, according to the present invention, there is provided a ferrite ceramics having a composition comprising 47.5 to 49.8 mol % of $Fe_2O_3$, 13.5 to 19.5 mol % of NiO, 21 to 27 mol % of ZnO, 7.5 to 12.5 mol % of CuO and 0.2 to 0.8 mol % of CoO, all of the molar amounts being calculated in terms of the respective oxides, the ferrite ceramics further comprising 0.2 to 1.4% by weight of $SnO_2$ and 0.005 to 0.03% by weight of S based on a weight of ferrite ceramics having the composition (Invention 1).

That is, according to the present invention, there is provided a ferrite sintered plate having a composition comprising 47.5 to 49.8 mol % of $Fe_2O_3$, 13.5 to 19.5 mol % of NiO, 21 to 27 mol % of ZnO, 7.5 to 12.5 mol % of CuO and 0.2 to 0.8 mol % of CoO, all of the molar amounts being calculated in terms of the respective oxides, the ferrite sintered plate further comprising 0.2 to 1.4% by weight of $SnO_2$ and 0.005 to 0.03% by weight of S (Invention 2).

That is, according to the present invention, there is provided a ferrite sintered plate having a composition comprising 47.5 to 49.8 mol % of $Fe_2O_3$, 13.5 to 19.5 mol % of NiO, 21 to 27 mol % of ZnO, 7.5 to 12.5 mol % of CuO and 0.2 to 0.8 mol % of CoO, all of the molar amounts being calculated in terms of the respective oxides, the ferrite sintered plate further comprising 0.2 to 1.4% by weight of $SnO_2$ and 0.005 to 0.03% by weight of S and having a density of 5.05 to 5.30 $g/cm^3$ (Invention 3).

In addition, according to the present invention, there is provided a ferrite sintered sheet comprising the ferrite sintered plate as defined in the above Invention 2 or 3, an adhesive layer formed on one surface of the ferrite sintered plate, and a protective layer formed on an opposite surface of the ferrite sintered plate (Invention 4).

Further, according to the present invention, there is provided a ferrite sintered sheet comprising the ferrite sintered plate as defined in the above Invention 2 or 3, and adhesive layers respectively formed on opposite surfaces of the ferrite sintered plate (Invention 5).

Furthermore, according to the present invention, there is provided a ferrite sintered sheet comprising the ferrite sintered plate as defined in the above Invention 2 or 3, and protective layers respectively formed on opposite surfaces of the ferrite sintered plate (Invention 6).

Also, according to the present invention, there is provided the ferrite sintered sheet as defined in any one of the above Inventions 4 to 6, wherein at least one groove is formed on at least one surface of the ferrite sintered plate (Invention 7).

Also, according to the present invention, there is provided the ferrite sintered sheet as defined in any one of the above Inventions 4 to 6, wherein the ferrite sintered plate is divided into small parts (Invention 8).

Advantageous Effects of Invention

The ferrite ceramics, the ferrite sintered plate and the ferrite sintered sheet according to the present invention have a large $\mu'$ value, a small $\mu''$ value, and a small temperature-dependent change of the $\mu'$ value and therefore can be suitably used as a member capable of increasing and stabilizing communication sensitivity of a system such as NFC.

DESCRIPTION OF EMBODIMENTS

Figure 1:
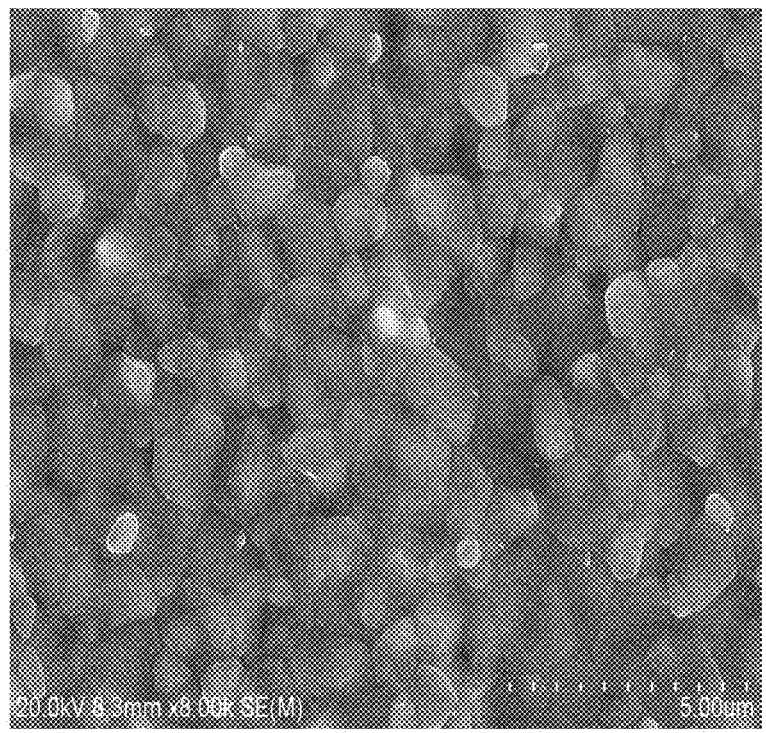
FIG. 1 is a scanning electron micrograph showing a microfine structure of the ferrite sintered plate obtained in Example 1.

The construction of the present invention is described in detail below.

The ferrite ceramics and the ferrite sintered plate according to the present invention have a composition comprising 47.5 to 49.8 mol % of $Fe_2O_3$, 13.5 to 19.5 mol % of NiO, 21 to 27 mol % of ZnO, 7.5 to 12.5 mol % of CuO and 0.2 to 0.8 mol % of CoO, with the proviso that a total amount of these components is 100 mol %, all of the molar amounts being calculated in terms of the respective oxides. The ferrite ceramics and the ferrite sintered plate further comprises 0.2 to 1.4% by weight of $SnO_2$ and 0.005 to 0.03% by weight of S based on a total weight of the above composition, namely the ferrite ceramics and the ferrite sintered plate are in the form of a mixture comprising the ferrite constituted of $Fe_2O_3$, NiO, ZnO, CuO and CoO, $SnO_2$ and S.

When the content of $Fe_2O_3$ in the ferrite ceramics and the ferrite sintered plate according to the present invention is less than 47.5 mol %, the $\mu'$ value of the ferrite ceramics and the ferrite sintered plate tends to be decreased. When the content of $Fe_2O_3$ in the ferrite ceramics and the ferrite sintered plate according to the present invention is more than 49.8 mol %, it is not possible to sinter the ferrite composition. The content of $Fe_2O_3$ in the ferrite ceramics and the ferrite sintered plate according to the present invention is more preferably 48 to 49.5 mol %.

When the content of NiO in the ferrite ceramics and the ferrite sintered plate according to the present invention is less than 13.5 mol %, the $\mu''$ value of the ferrite ceramics and the ferrite sintered plate tends to be increased. When the content of NiO in the ferrite ceramics and the ferrite sintered plate according to the present invention is more than 19.5 mol %, the $\mu'$ value of the ferrite ceramics and the ferrite sintered plate tends to be decreased. The content of NiO in the ferrite ceramics and the ferrite sintered plate according to the present invention is more preferably 14.5 to 18.5 mol %.

When the content of ZnO in the ferrite ceramics and the ferrite sintered plate according to the present invention is less than 21 mol %, the $\mu'$ value of the ferrite ceramics and the ferrite sintered plate tends to be decreased. When the content of ZnO in the ferrite ceramics and the ferrite sintered plate according to the present invention is more than 27 mol %, the $\mu''$ value of the ferrite ceramics and the ferrite sintered plate tends to be increased. The content of ZnO in the ferrite ceramics and the ferrite sintered plate according to the present invention is more preferably 22 to 26 mol %.

When the content of CuO in the ferrite ceramics and the ferrite sintered plate according to the present invention is less than 7.5 mol %, it is not possible to sinter the ferrite composition. When the content of CuO in the ferrite ceramics and the ferrite sintered plate according to the present invention is more than 12.5 mol %, CuO tends to be precipitated and the $\mu'$ value of the ferrite ceramics and the ferrite sintered plate tends to be decreased. The content of CuO in the ferrite ceramics and the ferrite sintered plate according to the present invention is more preferably 8.5 to 11.5 mol %.

When the content of CoO in the ferrite ceramics and the ferrite sintered plate according to the present invention is less than 0.2 mol %, the $\mu''$ value of the ferrite ceramics and the ferrite sintered plate tends to be increased. When the content of CoO in the ferrite ceramics and the ferrite sintered plate according to the present invention is more than 0.8 mol %, the $\mu'$ value of the ferrite ceramics and the ferrite sintered plate tends to be decreased and the temperature-dependent change of the $\mu'$ of the ferrite ceramics and the ferrite sintered plate tends to be increased. The content of CoO in the ferrite ceramics and the ferrite sintered plate according to the present invention is more preferably 0.2 to 0.7 mol %.

When the content of $SnO_2$ in the ferrite ceramics and the ferrite sintered plate according to the present invention is less than 0.2% by weight, the temperature-dependent change of the $\mu'$ value of the ferrite ceramics and the ferrite sintered plate tends to be increased. When the content of $SnO_2$ in the ferrite ceramics and the ferrite sintered plate according to the present invention is more than 1.4% by weight, the $\mu'$ value of the ferrite ceramics and the ferrite sintered plate tends to be decreased. The content of $SnO_2$ in the ferrite ceramics and the ferrite sintered plate according to the present invention is more preferably 0.2 to 1.3% by weight.

When the content of S in the ferrite ceramics and the ferrite sintered plate according to the present invention is less than 0.005% by weight, the ferrite ceramics and the ferrite sintered plate tend to be deteriorated in sintering properties and the μ' value of the ferrite ceramics and the ferrite sintered plate tends to be decreased. When the content of S in the ferrite ceramics and the ferrite sintered plate according to the present invention is more than 0.03% by weight, not only the temperature-dependent change of the μ' value of the ferrite ceramics and the ferrite sintered plate, but also the μ" value of the ferrite ceramics and the ferrite sintered plate tend to be increased. The content of S in the ferrite ceramics and the ferrite sintered plate according to the present invention is more preferably 0.007 to 0.025% by weight.

When the density of the ferrite sintered plate according to the present invention is less than 5.05 g/cm³, voids having a size of not more than several μm tend to be formed in the microfine structure thereof, so that the resulting ferrite sintered plate tends to have a non-uniform microfine structure and therefore tends to be easily broken upon handling. The ferrite sintered plate has a theoretical density of about 5.30 g/cm³, and the upper limit of the density of the ferrite sintered plate according to the present invention is therefore 5.30 g/cm³. When the density of the ferrite sintered plate lies within the range of 5.05 to 5.30 g/cm³ as defined in the present invention, formation of the voids in the microfine structure can be avoided, so that the ferrite sintered plate can be prevented from be broken upon handling, which results in high productivity thereof. In order to achieve the density of the ferrite sintered plate which is controlled to the aforementioned range, the proportions of the respective constituting components are adjusted to the above-specified ranges, and the sintering temperature is suitably controlled.

The thickness of the ferrite sintered plate according to the present invention is preferably 0.01 to 0.7 mm, and more preferably 0.02 to 0.7 mm.

The ferrite sintered plate according to the present invention may be provided on at least one surface thereof with an adhesive layer. The thickness of the adhesive layer is preferably 0.001 to 0.1 mm.

The ferrite sintered plate according to the present invention may be provided on at least one surface thereof with a protective layer. The thickness of the protective layer is preferably 0.001 to 0.1 mm.

The μ' value of the ferrite sintered sheet according to the present invention (as measured at 25° C.) is preferably 90 to 180, and more preferably 100 to 170.

The μ" value of the ferrite sintered sheet according to the present invention (as measured at 25° C.) is preferably 0.05 to 5, and more preferably 0.1 to 4.5.

The temperature-dependent change of the μ' value of the ferrite sintered sheet according to the present invention (calculated as a ratio of a difference between a real part $\mu'_{85}$ of a magnetic permeability of the ferrite sintered sheet as measured at 85° C. and a real part $\mu'_{25}$ of a magnetic permeability thereof as measured at 25° C. to the real part $\mu'_{25}$ (($\mu'_{85}-\mu'_{25}$)/$\mu'_{25}$)) is preferably 5 to 30%, and more preferably 5 to 25%.

The adhesive layer used in the present invention may be formed of a double-sided adhesive tape. The double-sided adhesive tape is not particularly limited, and any known double-sided adhesive tape may be used as the adhesive layer. In addition, the adhesive layer may be provided on one surface of the ferrite sintered plate in the form of a laminated layer obtained by sequentially laminating an adhesive layer, a bendable and stretchable film or sheet, an adhesive layer and a release sheet on one another.

The provision of the protective layer used in the present invention is capable of enhancing a reliability and durability against dusting caused upon dividing the ferrite sintered plate into parts. The protective layer is not particularly limited as long as the protective layer is formed of a resin that can be stretched without breakage when bending the ferrite sintered sheet. Examples of the protective layer include a PET film and the like.

In the ferrite sintered sheet according to the present invention, in order to attach the ferrite sintered sheet to a bent portion, the ferrite sintered plate may have such a structure that the ferrite sintered plate can be divided into parts along at least one groove as a starting point for the division which is previously formed on at least one surface of the ferrite sintered plate. The groove may be formed either continuously or intermittently. In addition, a number of fine recesses may be substituted for the groove. The groove desirably has a U-shape or V-shaped section.

In the ferrite sintered sheet according to the present invention, in order to attach the ferrite sintered sheet to a bent portion and prevent the sheet from breaking upon use, the ferrite sintered plate is preferably previously divided into small parts. For example, there may be used any of the method in which the ferrite sintered plate is divided into parts along at least one groove as a starting point for the division which is previously formed on at least one surface of the ferrite sintered plate, and the method in which the ferrite sintered plate is divided into small parts without forming any groove or grooves.

The ferrite sintered plate may be divided into parts having an optional size which may be of a triangle shape, a quadrilateral shape, a polygonal shape or a combination of any two or more of these shapes, by the grooves. For example, the length of one side of the triangle shape, quadrilateral shape or polygonal shape is usually 1 to 12 mm. When a member onto which the ferrite sintered sheet is to be attached has a curved surface, the length of one side of the triangle shape, quadrilateral shape or polygonal shape is preferably not less than 1 mm and not more than ⅓ of a radius of curvature of the member, and more preferably not less than 1 mm and not more than ¼ of a radius of curvature of the member. In the case where any groove or grooves are formed on the ferrite sintered plate, the ferrite sintered sheet is hardly broken into irregular shapes at positions other than the groove, and can be brought into close contact with or substantially close contact with not only a flat surface, but also a curved side surface of a cylindrical body and a slightly irregular surface.

The width of an opening of the groove formed on the ferrite sintered plate is usually preferably not more than 250 μm, and more preferably 1 to 150 μm. When the width of an opening of the groove is more than 250 μm, the ferrite sintered plate tends to suffer from undesirably large deterioration in magnetic permeability. In addition, the depth of the groove is usually ½₀ to ⅗ of the thickness of the ferrite sintered plate. Meanwhile, in the case where the thickness of the ferrite sintered plate is as thin as 0.01 mm to 0.2 mm, the depth of the groove is preferably ½₀ to ¼ of the thickness of the ferrite sintered plate, and more preferably ½₀ to ⅙ of the thickness of the ferrite sintered plate.

Next, the processes for producing the ferrite sintered plate and the ferrite sintered sheet according to the present invention are described.

First, the ferrite particles may be produced by pre-calcining a raw material mixture prepared by mixing raw materials such as oxides, carbonates, hydroxides, oxalates, etc., of the respective elements as constituents of the ferrite at a predetermined compositional ratio, or a precipitate prepared by precipitating the respective elements in an aqueous solution thereof, in atmospheric air in a temperature range of 700 to 900° C. for 1 to 20 hr, and then pulverizing the resulting pre-calcined product. In this case, even in the case where $SnO_2$ is further subsequently added to the raw material mixture for preparing the ferrite and then the resulting mixture is pre-calcined, the $SnO_2$ is not incorporated into the ferrite as a constituent thereof. Therefore, it is preferred that the $SnO_2$ is previously added to the raw material mixture for preparing the ferrite. Alternatively, the $SnO_2$ may be added to Ni—Zn—Cu—Co ferrite prepared by pre-calcining the respective raw materials, followed by pulverizing and mixing the resulting mixture to obtain mixed particles, or the $SnO_2$ may be added to Ni—Zn—Cu—Co ferrite prepared by pre-calcining and pulverizing the respective raw materials to obtain mixed particles.

In particular, as iron oxide as a supply source of an iron element, there is preferably used iron oxide prepared by calcining a precipitate obtained from iron sulfate and sodium hydroxide in an aqueous solution thereof. Since iron sulfate is used as the raw material, the resulting iron oxide comprises S remaining unremoved therefrom even after washing with water, etc., and the content of S in the iron oxide can be appropriately controlled during the process for production of the iron oxide. The ferrite particles obtained using the iron oxide as the raw material necessarily comprise S.

The resulting ferrite particles are mixed with a binder resin, and the resulting mixture is molded into a ferrite plate by a powder compression molding method, an injection molding method, a calendering method, an extrusion method, etc., and the resulting molded product is subjected to sintering treatment, if required, after degreasing treatment, whereby it is possible to obtain the ferrite sintered plate. Alternatively, the ferrite particles, a binder resin and a solvent are mixed with each other, and the resulting mixture is applied onto a film or a sheet using a doctor blade, etc., to obtain a green sheet, and the resulting green sheet is subjected to sintering treatment, if required after being subjected to degreasing treatment, whereby it is possible to obtain the ferrite sintered plate. Incidentally, a plurality of the obtained green sheets may be laminated on each other and thereafter may be subjected to sintering treatment.

In the case where the groove or grooves are formed on the ferrite sintered plate according to the requirements, it is possible to form the groove or grooves during or after molding the ferrite plate or after the sintering treatment. For example, in the case where the ferrite plate is molded by a powder compression molding method or an injection molding method, it is preferable to form the groove or grooves during the molding, whereas in the case where the ferrite plate is molded by a calendering method or an extrusion method, it is preferable to form the groove or grooves after the molding but before the sintering. In the case where the sintered ferrite plate is produced via the green sheet, it is preferable to form the groove or grooves on the green sheet.

The degreasing treatment is usually carried out at a temperature of 150 to 500° C. The sintering temperature is usually 850 to 970° C., and preferably 860 to 960° C. The sintering time is usually 30 to 180 min, and preferably 30 to 120 min. When the sintering temperature is lower than 850° C., it may be difficult to sinter the particles, so that the resulting sintered ferrite plate tends to be insufficient in strength, and the $\mu'$ value thereof tends to be decreased. On the other hand, when the sintering temperature is higher than 970° C., growth of the particles tends to undesirably proceed, and not only the temperature-dependent change of the $\mu'$ value of the resulting sintered ferrite plate, but also the $\mu''$ value thereof tend to be increased. When the sintering time is less than 30 min, it may be difficult to sinter the particles, so that the resulting sintered ferrite plate tends to be insufficient in strength, and the $\mu'$ value thereof tends to be decreased. On the other hand, since the sintering time of 180 min is sufficient to allow the sintering to well proceed, it is not necessary to prolong the sintering time over 180 min.

In the present invention, the proportions between the respective constituting components are controlled within the predetermined ranges, and the sintering temperature is suitably controlled, so that it is possible to produce the ferrite ceramics having desired properties (such as magnetic permeability values $\mu'$ and $\mu''$, temperature-dependent change of $\mu'$ and density).

Next, an adhesive material layer, for example, a double-sided adhesive tape, may be provided on a surface of the resulting ferrite sintered plate, if required. The adhesive material layer may be formed on one surface or opposite surfaces of the ferrite sintered plate.

In addition, a protective layer may be provided on a surface of the resulting ferrite sintered plate, if required. The protective layer may be formed on one surface or opposite surfaces of the ferrite sintered plate. The protective layer may be produced by bonding a film or a sheet of a resin constituting the protective layer onto the surface of the sintered ferrite plate, if required, through an adhesive, or by applying a coating material comprising a resin constituting the protective layer onto the surface of the sintered ferrite plate. When forming the protective layer, it is possible to prevent occurrence of dusting in the ferrite sintered plate.

Also, according to the present invention, the adhesive layer may be formed on one surface of the ferrite sintered plate, and the protective layer may be formed on the opposite surface of the ferrite sintered plate.

In the case where the ferrite sintered plate are divided into parts along the groove or grooves, after forming the adhesive layer and/or protective layer thereon, the division of the ferrite sintered plate may be conducted using a roller.

<Function>

The most important point of the present invention resides in such a fact that the ferrite ceramics, the ferrite sintered plate or the ferrite sintered sheet having a specific composition according to the present invention has a high $\mu'$ value, a low $\mu''$ value and a small temperature-dependent change of the $\mu'$ value. Due to the above fact, an antenna produced from the ferrite material of the present invention can exhibit a large inductance and a small loss thereof, so that it is possible to enhance communication sensitivity of the antenna. Further, since the temperature-dependent change of the $\mu'$ value is small, the change in inductance of the antenna depending upon the change in outside air temperature when used outdoors also becomes small, so that it is possible to conduct stable communication with the antenna. In addition, the ferrite sintered plate according to the present invention has a high density and a dense microfine structure and therefore is hardly broken upon handling and can be enhanced in productivity.

EXAMPLES

Typical embodiments of the present invention are as follows.

The composition of the ferrite sintered plate was measured using a fluorescent X-ray analyzer "3530" manufactured by Rigaku Corporation and a carbon/sulfur analyzer "EMIA-920V2" manufactured by Horiba Ltd.

The density of the ferrite sintered plate was calculated from an outer dimension and a weight of the ferrite sintered plate measured using calipers and a micrometer.

The thickness of each of the ferrite sintered plate and the ferrite sintered sheet was measured using a micrometer.

The $\mu'$ value and the $\mu''$ value of the ferrite sintered plate were measured as follows. That is, both the values of a ring blanked into an outer diameter of 20 mm and an inner diameter of 10 mm were measured at a frequency of 13.56 MHz using an impedance/material analyzer "E4991A" manufactured by Agilent Technologies.

The temperature-dependent change $\Delta\mu'$ of the $\mu'$ value of the ferrite sintered sheet was evaluated by the value expressed by a percentage of a ratio of a difference between a real part $\mu'_{85}$ of a magnetic permeability of the ferrite sintered sheet as measured at 85° C. and a real part $\mu'_{25}$ of a magnetic permeability thereof as measured at 25° C. to the real part $\mu'_{25}$ (($\mu'_{85}-\mu'_{25}$)/$\mu'_{25}$).

The microfine structure of the ferrite sintered plate was observed using a field emission scanning electron microscope "S-4800 Model" manufactured by Hitachi High-Technologies Corp., at a magnification of 8000 times.

Example 1

The respective raw material oxides were weighed such that the ferrite obtained therefrom had a predetermined composition, and wet-mixed with each other for 20 hr using a ball mill. The resulting mixed slurry was filtered to separate a solid component therefrom, and the thus separated solid component was dried to obtain mixed particles as a raw material. The thus obtained mixed particles were calcined at 720° C. for 3 hr, and the resulting pre-calcined product was pulverized using a ball mill, thereby obtaining Ni—Zn—Cu—Co ferrite particles according to the present invention. Incidentally, S in the ferrite particles was derived from the iron sulfate used for production of $Fe_2O_3$ as the raw material.

Eight parts by weight of polyvinyl butyral as a binder material, 3 parts by weight of benzyl-n-butyl phthalate as a plasticizer and 50 parts by weight of 3-methyl-3-methoxy-1-butanol as a solvent were added to 100 parts by weight of the thus obtained Ni—Zn—Cu—Co ferrite particles, and the resulting mixture was fully mixed to obtain a slurry. The thus obtained slurry was applied onto a PET film using a doctor blade-type coater to form a coating film thereon. The coating film was then dried to obtain a green sheet having a thickness of 120 μm.

Using a blade mold having a V-shaped blade tip, grooves each having a depth of 50 μm were formed in grids at the intervals of 3 mm on a surface of the green sheet.

The resulting green sheet was degreased at 400° C., and sintered at 920° C. for 2 hr, thereby obtaining a ferrite sintered plate. The thus obtained ferrite sintered plate had a composition comprising 48.37 mol % of $Fe_2O_3$, 16.95 mol % of NiO, 23.43 mol % of ZnO, 10.97 mol % of CuO and 0.28 mol % of CoO. The ferrite sintered plate further comprised 0.40% by weight of $SnO_2$ and 0.01% by weight of S based on the total weight of the composition, and had a thickness of 98 μm, and a density of 5.17 g/cm³. Incidentally, it was estimated that S was present in the form of an oxide thereof (such as $SO_2$, $SO_3$ and the like). The microfine structure of the ferrite sintered plate is shown in FIG. 1. As shown in FIG. 1, it was confirmed that the microfine structure of the ferrite sintered plate was dense without voids.

A PET film was attached onto one surface of the resulting ferrite sintered plate, and a double-sided tape was attached onto the other surface of the ferrite sintered plate, thereby obtaining a ferrite sintered sheet. The thickness of the resulting ferrite sintered sheet was 118 μm.

The resulting ferrite sintered sheet was divided into parts, and the divided sheet had $\mu'$ of 148, $\mu''$ of 2.8 and $\Delta\mu'$ of 14% as measured at a frequency of 13.56 MHz.

Examples 2 to 9

Respective ferrite sintered plates and ferrite sintered sheets were produced by the same method as in Example 1. The production conditions used in the Examples and various properties of the thus obtained ferrite sintered plates and ferrite sintered sheets are shown in Table 1.

Comparative Example 1

Figure 2:
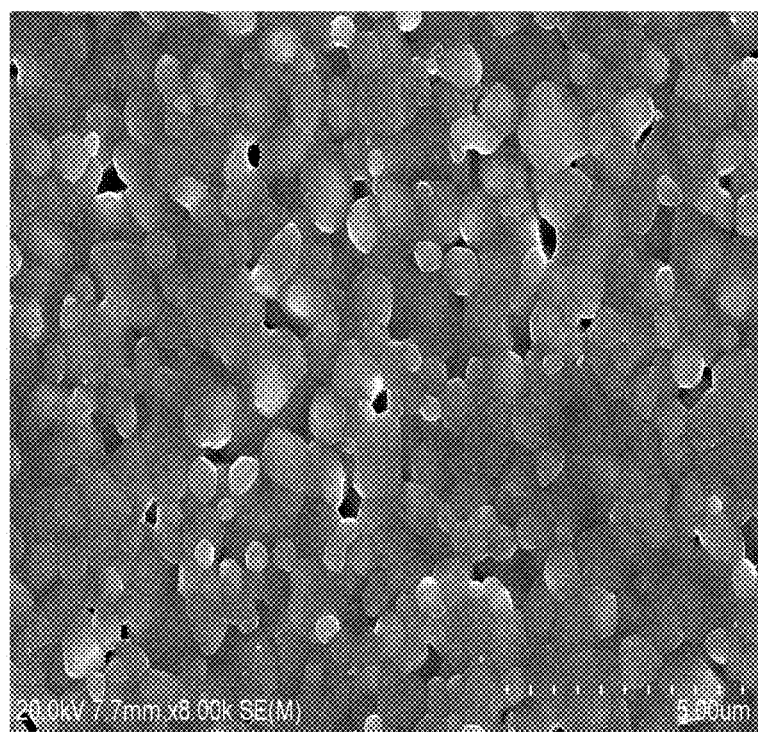
FIG. 2 is a scanning electron micrograph showing a microfine structure of the ferrite sintered plate obtained in Comparative Example 1.

The ferrite sintered plate and the ferrite sintered sheet were produced by the same method as in Example 1. The production conditions used in Comparative Example 1 and various properties of the thus obtained ferrite sintered plate and ferrite sintered sheet are shown in Table 1. The microfine structure of the obtained ferrite sintered plate is shown in FIG. 2. As shown in FIG. 2, it was confirmed that a large number of voids were present in the microfine structure of the obtained ferrite sintered plate.

Comparative Examples 2 to 7

Respective ferrite sintered plates and ferrite sintered sheets were produced by the same method as in Example 1. The production conditions used in the Comparative Examples and various properties of the thus obtained ferrite sintered plates and ferrite sintered sheets are shown in Table 1.

TABLE 1

| No. | $Fe_2O_3$ [mol %] | NiO [mol %] | ZnO [mol %] | CuO [mol %] | CoO [mol %] |
|---|---|---|---|---|---|
| Example 1 | 48.37 | 16.95 | 23.43 | 10.97 | 0.28 |
| Example 2 | 49.44 | 17.30 | 24.83 | 7.66 | 0.77 |
| Example 3 | 49.72 | 18.48 | 22.20 | 9.15 | 0.45 |
| Example 4 | 47.61 | 19.42 | 21.13 | 11.63 | 0.21 |
| Example 5 | 48.50 | 13.54 | 26.89 | 10.51 | 0.56 |
| Example 6 | 48.06 | 14.58 | 25.87 | 10.83 | 0.66 |
| Example 7 | 48.50 | 17.23 | 22.33 | 11.46 | 0.48 |
| Example 8 | 48.65 | 17.44 | 24.98 | 8.54 | 0.39 |
| Example 9 | 48.57 | 17.43 | 21.19 | 12.39 | 0.42 |
| Comparative Example 1 | 49.83 | 16.79 | 25.48 | 7.42 | 0.48 |
| Comparative Example 2 | 47.38 | 16.76 | 24.61 | 10.43 | 0.82 |
| Comparative Example 3 | 48.67 | 13.39 | 27.02 | 10.89 | 0.56 |
| Comparative Example 4 | 48.41 | 19.48 | 20.92 | 10.88 | 0.31 |
| Comparative Example 5 | 48.78 | 16.27 | 21.59 | 12.58 | 0.78 |
| Comparative Example 6 | 48.64 | 17.02 | 23.18 | 10.98 | 0.18 |
| Comparative Example 7 | 48.58 | 15.07 | 24.88 | 11.23 | 0.24 |

TABLE 1-continued

| No. | SnO$_2$ [wt %] | S [wt %] | Sintering temperature [° C.] | Density [g/cm$^3$] |
|---|---|---|---|---|
| Example 1 | 0.40 | 0.010 | 920 | 5.17 |
| Example 2 | 1.38 | 0.006 | 965 | 5.27 |
| Example 3 | 0.55 | 0.025 | 955 | 5.24 |
| Example 4 | 0.22 | 0.008 | 865 | 5.10 |
| Example 5 | 0.41 | 0.030 | 915 | 5.09 |
| Example 6 | 1.27 | 0.012 | 930 | 5.12 |
| Example 7 | 0.50 | 0.027 | 855 | 5.05 |
| Example 8 | 0.87 | 0.019 | 925 | 5.16 |
| Example 9 | 1.04 | 0.015 | 925 | 5.14 |
| Comparative Example 1 | 1.38 | 0.003 | 900 | 5.01 |
| Comparative Example 2 | 0.19 | 0.015 | 920 | 5.15 |
| Comparative Example 3 | 0.65 | 0.021 | 955 | 5.19 |
| Comparative Example 4 | 0.45 | 0.012 | 850 | 4.86 |
| Comparative Example 5 | 1.44 | 0.017 | 875 | 4.91 |
| Comparative Example 6 | 0.33 | 0.014 | 935 | 5.18 |
| Comparative Example 7 | 0.87 | 0.032 | 960 | 5.21 |

| No. | μ' 13.56 MHz | μ" 13.56 MHz | Δμ' | Thickness [μm] |
|---|---|---|---|---|
| Example 1 | 148 | 2.8 | 14 | 98 |
| Example 2 | 167 | 4.5 | 24 | 211 |
| Example 3 | 178 | 4.9 | 29 | 50 |
| Example 4 | 92 | 0.06 | 7 | 449 |
| Example 5 | 159 | 4.1 | 23 | 11 |
| Example 6 | 125 | 1.4 | 8 | 597 |
| Example 7 | 102 | 0.2 | 6 | 694 |
| Example 8 | 147 | 2.8 | 9 | 145 |
| Example 9 | 138 | 2.3 | 11 | 20 |
| Comparative Example 1 | 65 | 0.01 | 21 | 105 |
| Comparative Example 2 | 77 | 0.05 | 48 | 197 |
| Comparative Example 3 | 187 | 5.3 | 69 | 88 |
| Comparative Example 4 | 78 | 1.2 | 53 | 90 |
| Comparative Example 5 | 55 | 0.01 | 20 | 101 |
| Comparative Example 6 | 163 | 10.2 | 23 | 100 |
| Comparative Example 7 | 170 | 7.1 | 58 | 304 |

INDUSTRIAL APPLICABILITY

The ferrite sintered sheet according to the present invention has a large μ' value, a small μ" value and a small temperature-dependent change of the μ' value. Therefore, an antenna produced from the ferrite sintered sheet can be stabilized in characteristics thereof against a change in outside air temperature, and the ferrite sintered sheet can be used by incorporating it into a portable device.

The invention claimed is:

1. A ferrite sintered sheet comprising a ferrite sintered plate, an adhesive layer or a protective layer that is formed on one surface of the ferrite sintered plate, and an adhesive layer or a protective layer that is formed on an opposite surface of the ferrite sintered plate,
wherein the ferrite sintered plate comprises a ferrite ceramics having a composition comprising 47.5 to 49.8 mol % of Fe$_2$O$_3$, 13.5 to 19.5 mol % of NiO, 21 to 27 mol % of ZnO, 7.5 to 12.5 mol % of CuO and 0.2 to 0.8 mol % of CoO, all of the molar amounts being calculated in terms of the respective oxides, which ferrite ceramics further comprises 0.2 to 1.4% by weight of SnO$_2$ and 0.005 to 0.03% by weight of S based on a weight of ferrite ceramics having the composition, and
wherein a temperature-dependent change of a μ' value of the ferrite sintered sheet calculated as a ratio of a difference between a real part μ'$_{85}$ of a magnetic permeability of the ferrite sintered sheet measured at 85° C. and a real part μ'$_{25}$ of a magnetic permeability of the ferrite sintered sheet measured at 25° C. to the real part μ'$_{25}$ ((μ'$_{85}$−μ'$_{25}$)/μ'$_{25}$)) is 5 to 30%.

2. The ferrite sintered sheet according to claim 1, wherein the ferrite sintered plate has a density of 5.05 to 5.30 g/cm$^3$.

3. The ferrite sintered sheet according to claim 1, wherein at least one groove is formed on at least one surface of the ferrite sintered plate.

4. The ferrite sintered sheet according to claim 1, wherein the ferrite sintered plate is divided into parts.

5. The ferrite sintered sheet according to claim 1, wherein a μ' value of the ferrite sintered sheet measured at 25° C. is 90 to 180.

6. The ferrite sintered sheet according to claim 1, wherein a μ" value of the ferrite sintered sheet measured at 25° C. is 0.05 to 5.

\* \* \* \* \*